May 26, 1931.   F. N. HENKEL   1,807,287
COMPRESSION AIR VALVE TESTER
Original Filed Feb. 19, 1929

Inventor
F. N. Henkel
Wilkinson & Giusta
Attorneys.

Patented May 26, 1931

1,807,287

UNITED STATES PATENT OFFICE

FRANK N. HENKEL, OF HAMMOND, LOUISIANA

COMPRESSION AIR VALVE TESTER

Application filed February 19, 1929, Serial No. 341,096. Renewed April 15, 1931.

The present invention relates to improvements in compressed air valve testers, and has for an object to provide a device more particularly applicable to testing the valves on pneumatic vehicle tires for leaks.

Another object of the invention is to provide a simple, small device which may be readily carried about as a part of the equipment of a motor vehicle for showing the condition of the tire valves.

A further object of the invention is to provide a device for testing the valves of tires or other valves for leakage, in which the device may be made economically and sold for a relatively small price.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved compressed air valve tester constructed according to the present invention and shown as applied to the valve stem indicated in dotted lines.

Figure 1:
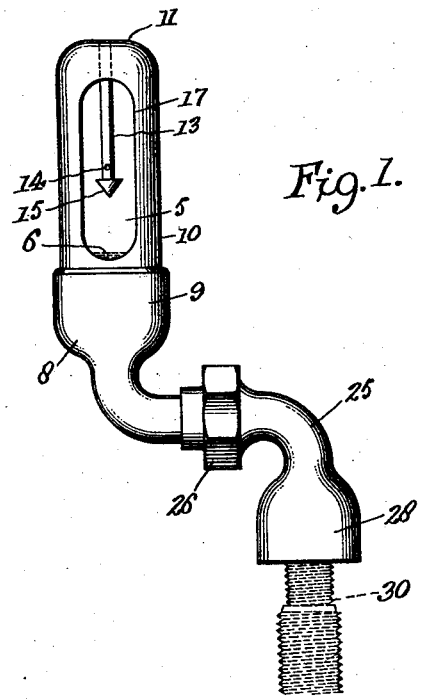

Referring more particularly to the drawings, 5 represents a tube or cylinder of glass or other appropriate transparent material constituting a chamber for receiving a body of liquid 6, such as oil.

At its lower end the tube 5 is arranged to rest upon a rubber or other flexible or resilient gasket 7 seated upon a base 8 having an internally threaded upstanding flange 9 for receiving the lower open externally threaded end portion of the protective jacket 10. The jacket may be made of metal or other appropriate material, and is closed at its top portion 11 except for a small threaded perforation 12 for detachably receiving the complementally threaded upper end portion of the small tube or pipe 13, which is open at its upper end to communicate with the external atmosphere and extends down into the glass cylinder 5, or rather into the upper portion of the chamber confined by the glass cylinder. The small tube or pipe 13 communicates interiorly with the air space of the chamber above the liquid column 6, and is shown to be provided with a perforation 14 in its side wall and above its lower end which carries an inverted conical enlarged head 15. A gasket 16 of rubber or other compressible or flexible material is disposed between the upper end of the glass cylinder 5, and the closed upper end portion 11 of the jacket.

As shown in Figure 1 the side wall of the jacket is slotted, as indicated at 17 for providing a sight opening through which the behavior of the liquid 6 in the chamber may be noted. In the base 8, which is preferably, though not necessarily, in the form of an elbow, a conduit 18 is made having a valve seat 19 at the mouth of the conduit which communicates with the chamber. A ball check valve 20 is adapted to close against the seat 19 and is confined in its upward movement by a semi-globular cage 21 having one or more perforations 22 to place the conduit in communication with the chamber. A flange 23 extending outwardly from the rim of the semi-globular cage is adapted to extend beneath the edge of the gasket 7, which gasket is preferably annular in form having a central opening for receiving the valve cage. Within the cage is a coil spring 24 disposed between the valve and the upper portion of the cage; the function of the spring being to urge the valve downwardly and yieldably against the seat 19.

A second elbow 25 bent reversely with respect to the elbow of the base is attached to the lower end of the base by any appropriate form of coupling 26. The elbow 25 is provided with a conduit 27 which forms a continuation of the conduit 18. The lower free end of the elbow 25 is bell-shaped, as indicated at 28, and contains within the same an annular flexible gasket 29 suitable for extending about the open mouth of the valve stem indicated at 30.

In the use of the device, the valve stem 30 is the usual valve stem found on the inner tubes of pneumatic tires, which valve stems project through the rim and felly of the wheel and are exposed for receiving a hose connection whereby the tire may be inflated to a proper pressure. These stems 30 contain what are known as "valve insides" (not shown) and very often these valve insides become worn or are defective, or from a number of causes become leaky, so that the air pressure escapes from within the tire and the tire becomes deflated. This accidental deflation is very important today because of the wide use of the low pressure balloon tire, which should not be permitted to vary below a margin of substantially five pounds pressure from the indicated pressure for the tire.

Figure 2:
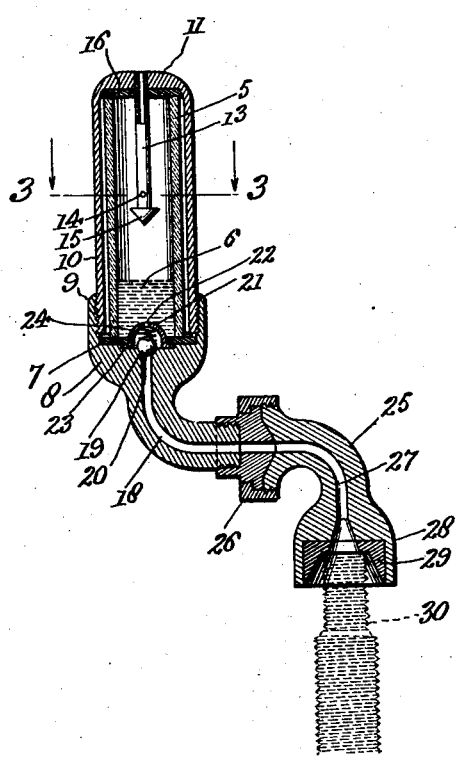
Figure 2 is a vertical section taken through the same.
Figure 3:
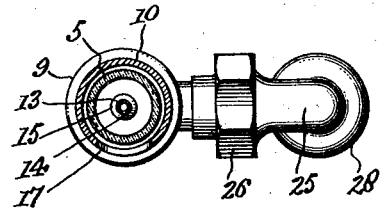
Figure 3 is a cross section taken on the line 3—3 in Figure 2.
Figure 4:
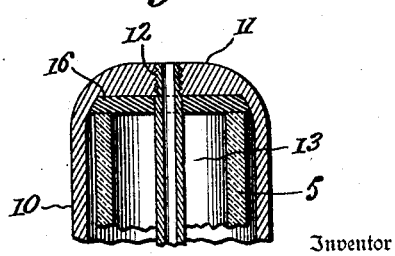
Figure 4 is an enlarged fragmentary vertical section of the upper portion of the device.

By applying the above described device about the valve stem 30 in the manner indicated in Figures 1 and 2, where the gasket 29 will avoid any leakage about the bell 28, any air escaping through a faulty valve stem 30 will be compelled to rise through the conduits 27 and 18, and to raise the check valve 20, passing up through the perforated cage and into the chamber, where the entrance of air will be observed because of the bubbles rising through the body of liquid 6.

In other words, when the device is applied to a valve stem, if no bubbles are shown to rise through the liquid 6, then the valve stem is in good shape and no leakage is occurring. On the other hand the presence of bubbles through the liquid 6 shows that the valve stem is faulty and that air is escaping from the tire. The operator thereupon renews the valve insides and avoids the dangerous and destructive leakage.

As the air passes up through the liquid 6 it would tend to accumulate in the head space of the chamber but for the small pipe 13 which permits this air to pass through the perforation 14 into the interior of the tube or pipe 13, and thence upwardly and out into the atmosphere. The conical head 15 will spread the liquid 6, if the same bubbles too violently so as to keep same out of the perforation 14. It also deflects the rising air outwardly and horizontally and prevents the same rushing directly to the perforation 14, but promotes a quiescent condition in the air or vapor space of the chamber, avoiding any disturbance of the liquid 6 or of the valve 20. The valve 20 may close whenever the liquid attempts to descend into the conduit 18, but opens freely when the air pressure in the conduit exceeds the load of the spring 24. The elbow 25 may be swivelly mounted on the base, so that it may be swung up when the device is to be packed away when not in use. The vent hole 14 is centrally placed so that if the device is laid or placed in any position, the liquid 6 will not run out of said vent hole.

It is obvious that various changes and modifications may be made in the details of construction and design of the above specifically described embodiment of this invention without departing from the spirit thereof, such changes and modifications being restricted only by the scope of the following claims.

What is claimed is:—

1. A compressed air valve tester comprising a flanged base having a conduit therethrough and a valve seat at the mouth of the conduit, a check valve adapted to close against said seat, a perforated cage about the check valve, resilient means acting between said valve and cage for normally retaining the valve closed, a compressible gasket on the base extending about said cage, a transparent tube seated at one end upon said gasket, a gasket also closing the upper end of said tube, a protective jacket extending above and about said glass tube and removably connected with the flange of the base, said jacket having a slotted side wall for observation into said chamber, a body of liquid in said chamber, and a narrow tube let in through the upper portion of the jacket and the upper gasket and having free interior communication both with the upper portion of the chamber and with the external atmosphere, said narrow tube having an inverted conical enlarged portion on its lower end.

2. A compressed air valve tester comprising a flanged base having a conduit therethrough and a valve seat at the mouth of the conduit, a check valve adapted to close against said seat, a perforated cage about the check valve, resilient means acting between said valve and cage for normally retaining the valve closed, a compressible gasket on the base extending about said cage, a transparent tube seated at one end upon said gasket, a gasket also closing the upper end of said tube, a protective jacket extending above and about said glass tube and removably connected with the flange of the base, said jacket having a slotted side wall for observation into said chamber, a body of liquid in said chamber, a small pipe leading through the wall of the protective jacket and gasket, and extending through the upper portion of the chamber confined by the glass tube, thereby having free interior communication both with the upper portion of the chamber and with the external atmosphere, said pipe having a conical head at its lower end and a perforation at its side wall to permit the escape of air from above the body of liquid.

3. A compressed air valve tester comprising a chamber, a conduit in communication with the lower portion of said chamber and having means for connection to air valve, a body of liquid in the lower portion of the chamber, a check valve in the chamber controlling the conduit for permitting the entrance of air upwardly into the chamber, but closing to prevent the escape downwardly of liquid, and a narrow tube let in through the upper portion of the chamber and extending above the liquid body, the tube being in communication with the atmosphere and having a perforation in its side wall near the lower end for the escape of entrapped air from the chamber, said narrow tube having an inverted conical enlarged portion on its lower end adjacent said perforation.

FRANK N. HENKEL.